E. D & O. B. Reynolds.
Seed-Sower.
N<sup>o</sup> 73463. Patented Jan. 21, 1868.
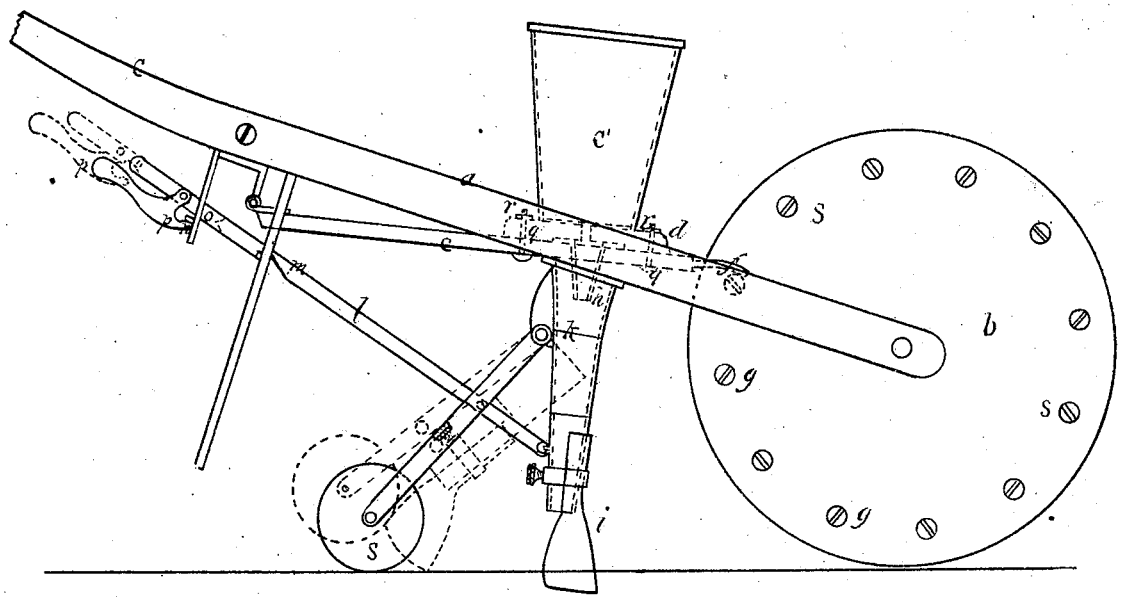
Witnesses:
S. B. Kidder
M. W. Frothingham
Inventors:
E. D. & O. B. Reynolds,
by their Attys
Crosby, Halsted & Gould

United States Patent Office.

E. D. REYNOLDS AND O. B. REYNOLDS, OF NORTH BRIDGEWATER, MASSACHUSETTS.

Letters Patent No. 73,463, dated January 21, 1868.

IMPROVEMENT IN SEED-SOWERS.

The Schedule referred to in these Letters Patent and making part of the same.

TO ALL WHOM IT MAY CONCERN:

Be it known that we, E. D. REYNOLDS and O. B. REYNOLDS, of North Bridgewater, in the county of Plymouth, and State of Massachusetts, have invented certain new and useful Improvements in Seed-Sowers; and we do hereby declare that the following, taken in connection with the drawings which accompany and form part of this specification, is a description of our invention sufficient to enable those skilled in the art to practise it.

In the construction of that class of seed-sowers, each of which is made with a wheel and handles, like a wheel-barrow, it is customary to combine with the seed-spout, or conductor, a drill or coulter, which opens a furrow for deposit of the seed therein, a roller or coverer following behind and burying the seed dropped through the spout and behind the coulter. Our invention relates to seed-sowing machines having this general organization, and consists, primarily, in the peculiar method of hanging and sustaining the coulter or furrow-opener.

The drawings represent a side elevation of a seed-sower embodying our improvements.

$a$ denotes the frame of the machine, mounted on a wheel, $b$, and having handles $c$ by which the machine is propelled. $c'$ is the seed-box, fixed to a base, $d$, which base is mounted on a tilting or hinged board, $e$, carrying a pin, $f$, against which pins $g$, on the wheel $b$, act, as the wheel rotates, to lift the board $e$, to effect the continual dropping of the seed, as shown in our patent, No. 49,302, granted August 8, 1865. This seed-box carries at its bottom a delivery-spout, $h$, which opens into a larger spout or conductor, leading down nearly to the surface of the ground, and behind a coulter or drill, $i$, which may be fixed to the conductor, as seen in the drawing, or may be directly hung from the frame $a$.

When the sower is in operation, the parts are in position, as seen by the dark lines in the drawing, the treading-surface of the wheel $b$ riding over the surface of the ground, the coulter drilling the furrow the proper depth for the deposit of the seed dropped from the hopper or seed-box, and the coverer-wheel $s$ following after, and burying the seed, as in machines now in use.

To carry the coulter out of the way, when the sower is not being used for planting, (as when wheeling the machine to and from the field,) we joint it by a hinge, $k$, in such manner that it may be swung up, (as denoted by the red lines,) it being held up by a latch-bar, $l$, a notch, $m$, in which latches over a latch-plate, $n$. To hold the coulter firmly in vertical position while drilling the furrow, this bar $l$ is locked to the plate by a notch, $o$, and catch $p$, the pressure of the coulter coming directly against the bar in the direction of its length, the coulter being thereby immovably braced, and kept from injury.

The coulter is made adustable, as to depth of penetration, in the usual manner, and the opening of the seed-box into the conductor is adjusted, as to size, by slides, as in other sowers. Instead of permanently confining the base of the box to the board $e$, however, we fasten the bottom $d$ permanently to the body of the box, but apply the bottom, $d$, to the board $e$, so as to be removable therefrom, this being effected by screw-bolts $q$ and nuts $r$. This provision allows the seed-box and its contents to be removed whenever desirable, either for repairs, for changing the box, or for emptying or re-charging it in the seed-room.

With these provisions, (the necessity for which we have found by actual experience,) seed-sowers of this class are rendered very effective to the farmer, being made strong and durable, easy to manage, satisfactory in their working, simple in their construction, and capable of all desirable changes and adjustments.

1. We claim a seed-sower, having the coulter hinged in such manner that it may be elevated, and secured in elevated position, substantially as and for the purpose set forth.

2. We also claim bracing the coulter, when made with the above provision, by the brace or latch-bar $o$ and its locking-device or mechanism, substantially as shown and described.

3. Also, applying the hopper or seed-box to the tilting-board, substantially as shown and described.

E. D. REYNOLDS,
O. B. REYNOLDS.

Witnesses:
J. R. PERKINS,
CHAS. D. PACKARD.